United States Patent [19]

Moiseev et al.

[11] 4,107,141
[45] Aug. 15, 1978

[54] METHOD OF PREPARING PHENOLAMINE RESINS

[76] Inventors: Vladimir Vasilievich Moiseev, Leninsky prospekt, 63, kv. 12; Vladimir Vasilievich Kosovtsev, Leninsky prospekt, 13, kv. 13; Galina Prokofievna Kolesnikova, ulitsa Karia Marxa, 92, kv. 23; Tamara Ivanovna Esina, prospekt Patriotov, 30, kv. 38; Alexandr Nikolaevich Polukhin, ulitsa Gomelskaya, 5; Viktor Alexandrovich Zimnukhov, ploschad Lenina, 15, kv. 44, all of Voronezh, U.S.S.R.

[21] Appl. No.: 621,627

[22] Filed: Oct. 10, 1975

[51] Int. Cl.$^2$ .............................................. C08F 2/00
[52] U.S. Cl. .................................... 528/129; 260/519; 260/518 R; 260/570.5 P; 260/570.9; 260/45.9 R; 260/45.9 QB; 528/148; 528/152; 528/153; 528/159
[58] Field of Search ................ 260/51 R, 53 R, 57 C, 260/47 R, 47 CZ, 570.5 P, 570.9, 518 R, 519

[56] References Cited
U.S. PATENT DOCUMENTS

| | | | |
|---|---|---|---|
| 3,317,472 | 5/1967 | Fitko et al. | 260/51 R |
| 3,351,605 | 11/1967 | Harvey | 260/51 R |
| 3,433,767 | 3/1969 | Maselli | 260/51 R |
| 3,741,896 | 6/1973 | Abbott et al. | 260/570.5 P |
| 4,038,327 | 7/1977 | Brindell et al. | 260/570.9 |

*Primary Examiner*—Melvyn I. Marquis
*Attorney, Agent, or Firm*—Haseltine, Lake & Waters

[57] ABSTRACT

Novel phenolamine resins which are condensation products of hexamethylene tetramine with a phenol component such as an alkylphenol with 5 to 12 carbon atoms in the alkyl radical, styrene-alkylated phenol, cumylphenol, diphenylolpropane, hydroxybenzoic acid. The condensation reaction is conducted at a temperature ranging from 90° to 180° C.

The products thus prepared are efficient stabilizing agents for rubbers and vulcanizates.

4 Claims, No Drawings

METHOD OF PREPARING PHENOLAMINE RESINS

The present invention relates to polymeric materials and, more specifically, to phenolamine resins and a method of preparing same.

Phenolamine resins are extensively used in the production of varnishes, paints, electroinsulating materials, glass-fiber plastics.

The term phenolamine resins as used herein denotes products prepared by condensation of phenol, its substituted derivatives and hexamethylene tetramine.

In the case of phenol derivatives, the structure of such resins may be represented by the following general formula:

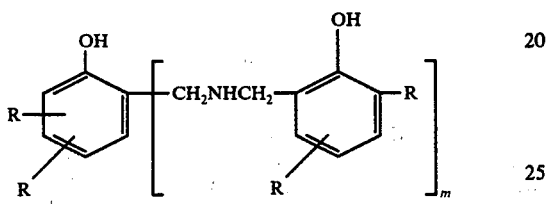

where R represents methyl, chlorine, tert.butyl, dimethyl, while $m$ is of from 1 to 10.

Characteristic feature of the phenolamine resins is the presence of phenol fragments linked by methylene amine bridges.

Molecular weight of said resins is defined by the molar ratio between the phenol component and hexamethylene tetramine and by the temperature of the resin manufacture. Phenolamine resins may be prepared without solvent, or in a solvent medium, both under atmospheric and over-atmospheric pressure and at a temperature within the range of from 80° to 180° C, preferably within the range of from 120° to 150° C. Technologically convenient is the synthesis of phenolamine resins, since the resin is prepared in one stage.

As the phenol component for the production of phenolamine resins use is made of phenol, cresol, xylenols, p-tert.butyl phenol. To prepare phenolamine resins use is made of dimethylvinylethynyl-4-oxyphenylmethane, a mixture of phenol, cresols and xylenols.

Those phenols are technologically inconvenient, since they comprise solid compounds with a high melting point such as p-tert.butylphenol or difficult-to-obtain as dimethylvinylethynyl-4-oxyphenylmethane, p-cresol.

Said phenolamine resins feature an essential disadvantage restricting their application, i.e. low solubility in aromatic aliphatic and cycloaliphatic hydrocarbons. Low solubility of said resins, in particular, does not make it possible to use them for compounding with rubbers in the stage of solution.

It is an object of the present invention to prepare such phenolamine resins which would possess a high solubility in hydrocarbons, would be obtained from readily-available raw materials, would be inexpensive and feature a high efficiency during stabilization and modification of rubbers and vulcanizates based thereon.

This object is accomplished by a method of preparing phenolamine resins of the formula:

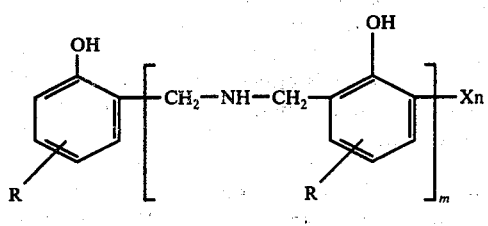

where X is H or

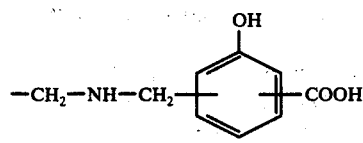

at X being H, R represents an alkyl radical with 5 to 12 carbon atoms, phenylethyl, cumyl, carboxy; at X being

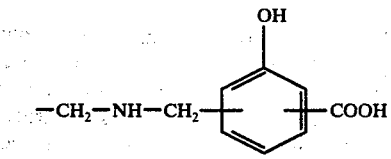

R represents and alkyl radical with 1 to 12 carbon atoms, phenylethyl, cumyl, hydroxyarylalkyl, carboxy; $n$ and $m$ are of from 1 to 20, which method, in accordance with the present invention, involves condensation of hexamethylene tetramine with a phenol component which is represented by alkylphenols with 5 to 12 carbon atoms in the alkyl radicals, styrene-alkylated phenol, cumylphenol, diphenylolpropane, or hydroxybenzoic acid.

Owing to the use of a substituted phenol with a long side chain as a phenol component selected from the series of hexylphenol, octylphenol, nonylphenol, dodecylphenol, styrene-alkylated phenol, cumylphenol or mixtures thereof with other phenol derivatives, corresponding phenolamine resins feature a high solubility in organic solvents. This property of the resins broadens the range of their application in industry.

Shown in Table 1 are data illustrating solubility of the phenolamine resin prepared in accordance with the present invention on the basis of octylphenol (resin A) in comparison with the prior art resins based on dimethylvinylethynyl-4-oxyphenylmethane (resin B), p-tert-.butylphenol (resin C), p-cresol (resin D).

Table 1

| | Solubiity of resins A, B, C and D at 20°C | | | |
|---|---|---|---|---|
| | | g per 100 ml of a solvent resins | | |
| No. | Solvent | A | B | C | D |
| 1. | Hexane | 80 | 1 | 1 | insoluble |
| 2. | Hexane-cyclohexane, 15:85 | 85 | 1 | 1.5 | insoluble |
| 3. | Toluene | 83 | 5 | 20 | 10 |

High solubility of the resins according to the present invention enables their extensive use in various industries.

When as the phenol component use is made of a hydroxybenzoic acid such as salicylic acid or para-hydroxybenzoic acid, phenolamine resins acquire a property to be soluble in alkalis. This property also broadens the application range of phenolamine resins.

In accordance with the present invention, the method of preparing said resins is effected by condensation of hexamethylene tetramine with a phenol component which is represented by an alkylphenol with a molecular weight of 160 to 350 and 5 to 12 carbon atoms in the alkyl radical such as styrene-alkylated phenol, cumylphenol, diphenylolpropane, hydroxybenzoic acid. Hexamethylene tetramine and the phenol component are taken in a molar ratio of from 0.02:1 to 1:1 and the reaction is conducted at a temperature ranging from 90° to 180° C.

Said resins feature an advantage residing in their non-toxicity, availability of raw materials; the method of producing such resins is readily commercially implemented without the formation of harmful waste waters. Alkylphenols with 5 to 12 carbon atoms as well as styrene-alkylated phenol, diphenylolpropane, hydroxybenzoic acids are available raw materials, since they are obtained on a commercial scale in all industrially developed countries.

It has been found that said phenolamine resins have a highly pronounced stabilizing effect against thermal ageing of rubbers and vulcanizates based thereon and a good compatibility with rubbers which is illustrated in Examples given hereinbelow. The use of the resins according to the present invention makes it possible to exclude such a toxic antioxidant as N-phenyl-2-naphthylamine (Neozone-D), to improve sanitary conditions of labour simultaneously enhancing quality of rubbers and vulcanizates.

For better understanding of the present invention some specific Examples 1 through 15 illustrating the method of preparing phenolamine resins and Examples 16 – 19 illustrating use thereof are given hereinbelow.

EXAMPLE 1

A mixture containing 97 g (0.5 g-mol) of octylphenol with the molecular weight of 194 and 14.0 g (0.1 g-mol) of hexamethylene tetramine are heated in a reaction flask under stirring to a temperature of 140° – 145° C. Condensation reaction which starts at this temperature is accompanied by self-heating of the reaction mixture to 165° C and vigorous evolution of ammonia. On completion of the reaction (20 – 30 minutes) evidenced by stoppage of the evolution of ammonia, the reaction mass is poured into a porcelain cup. The resins is rapidly cooled and comprises a solid brittle amber-coloured product. After disintegration it is in the form of a light-yellow powder with a drop point of 94° C. The resin yield is 107 g. The resin is readily soluble in benzene, toluene, hexane, cyclohexane. Characteristics of the resin are given in Table 2 hereinbelow.

Table 2

| No. | Parameters | Value |
|---|---|---|
| | Resin Characteristics | |
| 1. | Appearance | light-yellow powder |
| 2. | Molecular weight | 728 |
| 3. | Ubbelohde drop point, ° C | 94 |
| 4. | Dumas nitrogen content, % | 6.5 |
| 5. | Solubility, g per 100 ml of toluene | 83 |
| | hexane | 80 |
| | mixture hexane-cyclohexane (15:85) | 85 |

EXAMPLE 2

Taken for the reaction are 194 g (1.0 g-mol) of octylphenol (with the characteristic of Example 1) and 23.4 g (0.167 g-mol) of hexamethylene tetramine. Condensation without solvent is conducted as in Example 1. Condensation time, at a temperature of from 140° to 165° C, is 30 to 35 minutes. Characteristics of the thus-prepared resin are given in Table 3 hereinbelow.

Table 3

| No. | Parameter | Value |
|---|---|---|
| | Resin Characteristics | |
| 1. | Appearance | light-yellow powder |
| 2. | Molecular weight | 600 |
| 3. | Ubbelohde drop point, ° C | 88.5 |
| 4. | Dumas nitrogen content, % | 6.7 |
| 5. | Solubility, g per 100 ml of toluene | 81 |
| | hexane | 67 |
| | mixture hexane-cyclohexane (15:85) | 75 |

EXAMPLE 3

Taken for the reaction are 194 g (1.0 g-mol) of octylphenol (with the characteristic as in Example 1) and 46.6 g (0.333 g-mol) of hexamethylene tetramine. Condensation is conducted as in Example 1. Condensation temperature is within the range of from 150° to 165° C; reaction time is 20 – 25 minutes. Characteristics of the thus-prepared resin is given in Table 4.

Table 4

| No. | Parameters | Value |
|---|---|---|
| | Resin Characteristics | |
| 1. | Appearance | light-yellow powder |
| 2. | Molecular weight | 1084 |
| 3. | Ubbelohde drop point, ° C | 112.2 |
| 4. | Dumas nitrogen content, % | 6.89 |
| 5. | Solubility, g per 100 ml of toluene | 77 |
| | hexane | 61 |
| | mixture hexane-cyclohexane (15.85) | 72 |

EXAMPLE 4

Condensation of octylphenol with hexamethylene tetramine (HMTA) is conducted as in Examples 1, 2 and 3 at a molar ratio of the reagents of 1:1; 1:0.13; 1:0.1; 1:0.05; 1:0.02 at a temperature within the range of from 125° to 160° C. Characteristics of the thus-prepared aminophenol resins are given in Table 5.

Table 5

| No. | Ratio alkylphenols:HMTA | Ubbelohde drop point, ° C |
|---|---|---|
| | Resin Characteristics | |
| 1. | 1:1 | 160 |
| 2. | 1:0.13 | 78.7 |
| 3. | 1:0.1 | 70 |
| 4. | 1:0.05 | viscous liquid |
| 5. | 1:0.02 | viscous liquid |

EXAMPLE 5

A mixture containing 17.2 g (0.1 g-mol) of hexylphenol with the molecular weight of 170 and 7 g (0.05 g-mol) of hexamethylene tetramine are heated in a flask to a temperature of from 140° to 145° C under stirring. On completion of ammonia liberation (30 minutes) the reaction mass is poured into a porcelain cup. The resin is rapidly cooled and becomes a solid brittle amber-coloured product. After disintegration it comprises a light-yellow powder with the drop point of 105° C. The resin is readily soluble in benzene, toluene, hexane, cyclohexane. The resin characteristics are given in Table 6.

Table 6

| No. | Resin Characteristics Parameters | Value |
|---|---|---|
| 1. | Molecular weight | 680 |
| 2. | Ubbelohde drop point, °C | 105 |
| 3. | Dumas nitrogen content, % | 6.2 |
| 4. | Solubility, g per 100 ml of toluene | 72 |

EXAMPLE 6

A mixture of 10 g of nonylphenol with the molecular weight of 227 and 1.5 g of hexamethylene tetramine is heated to 160° C maintained at 160° – 170° C for 20 minutes and poured into a porcelain cup to form a light-yellow melt after cooling; the resin drop point is 118° C, molecular weight 1,400.

EXAMPLE 7

A mixture of 25 g of dodecylphenol with the molecular weight of 290 and 4 g of hexamethylene tetramine are heated at 150° – 170° C for one hour. After cooling, a melt is obtained having dark-brown colour and drop point of 60° C.

EXAMPLE 8

A mixture containing 37 g (0.175 g-mol) of cumylphenol (alkylation product of phenol with alpha-methylstyrene) with melting point of 68° – 71° C and 4.9 g (0.035 g-mol) of hexamethylene tetramine is heated to 135° C under stirring. Condensation reaction starting at this temperature is accompanied by self-heating of the reaction mixture to 150° C and vigorous liberation of ammonia. On completion of the reaction evidenced by the stoppage of ammonia evolution, the reaction mixture is poured into a porcelain cup. Cooled resin comprises a solid brittle amber-coloured product. After disintegration the resin is in the form of a light-yellow powder with the drop point of 101° C. The yield of resin is 40 g. The resin is well-soluble in cyclohexane. Characteristics of the resin are given in Table 7.

Table 7

| No. | Resin Characteristics Parameters | Value |
|---|---|---|
| 1. | Appearance | light-yellow powder |
| 2. | Molecular weight | 880 |
| 3. | Ubbelohde drop point °C | 101 |
| 4. | Dumas nitrogen content, % | 4.5 |
| 5. | Solubility in cyclohexane, g/100 ml | over 11 |

EXAMPLE 9

A mixture of 42 g (0.212 g-mol) of an alkylation product of phenol with styrene with a boiling point of from 140° to 150° C and molecular weight of 198 and 4.94 g (0.035 g-mol) of hexamethylene tetramine in a reaction flask are heated at 130° C for 50 minutes. The condensation reaction is accomplished by vigorous liberation of ammonia. After cooling the thus-prepared resin comprises a very viscous liquid of a golden-yellow colour. Molecular weight of the resin is 550, nitrogen content 4.1%.

EXAMPLE 10

A mixture of 20 g of diphenylolpropane (condensation product of phenol and acetone) and 4 g of hexamethylene tetramine are heated at 160° C for 30 minutes. Upon cooling a resin is obtained in the form of a brittle amber-coloured melt with the drop point of 158° C.

EXAMPLE 11

Into a flask provided with a stirrer 23.6 g (0.18 g-mol) of salicylic acid, 4 g (0.029 g-mol) of hexamethylene tetramine are charged and heated to 150° C. Ammonia evolution is observed during the reaction. After 20 minutes the flask contents is poured into a porcelain cup. The reaction mixture is solidified with the formation of an amber-coloured mass. The thus-prepared product has a drop point of 129.5° C and is insoluble in benzene and toluene. The resin is soluble in an aqueous solution of sodium hydroxide.

EXAMPLE 12

Into a flask there are charged 10 g (0.072 g-mol) of salicylic acid, 75 g (0.34 g-mol) of octylphenol and 15 g (0.107 g-mol) of hexamethylene tetramine. The reaction mass is heated and maintained at 145° C for 120 minutes. The resulting product comprises a melt of amber colour with the drop point of 141° C. Shown in Table 8 are characteristics of carboxyl-containing phenolamine resins depending on the content of salicylic acid in the reaction mixture. Most the resins thus prepared are soluble in an aqueous solution of sodium hydroxyde.

Table 8

Characteristics of carboxyl-containing phenolamine resins depending on the content of salicylic acid in the starting mixture

| No. | Salicyclic acid content, % | Drop point, °C | Molecular wt., (cryoscopic) | Solubility in toluene, % |
|---|---|---|---|---|
| 1 | 0 | 150 | 1,200 | 60 |
| 2 | 5 | 139 | 1,246 | — |
| 3 | 10 | 141 | 1,560 | 8 |
| 4 | 15 | 130 | — | 8 |
| 5 | 25 | 131 | 1,630 | — |
| 6 | 33 | 121 | — | — |
| 7 | 50 | 114 | — | poorly soluble |
| 8 | 85 | 129 | — | insoluble |

EXAMPLE 13

Into a reaction flask provided with a thermometer and stirrer 60 g (0.4 g-mol) of p-tert.butylphenol, 10 g (0.071 g-mol) of hexamethylene tetramine and 7.8 g (0.056 g-mol) of salicylic acid are charged.

The reaction mixture is heated to the temperature of 150° C. The reaction is accompanied by vigorous evolution of ammonia. The mixture is maintained at 150° C for 1.5 hours and then is poured, still in a hot condition, into a cup and the reaction mass is solidified in the form of a solid brittle amber-coloured resin. Drop point is 140° C.

EXAMPLE 14

Into a reaction flask provided with a stirrer and thermometer 90 g (0.45 g-mol) of an alkylation product of phenol with styrene (a mixture of phenylethylphenols), 15 g (0.107 g-mol) of hexamethylene tetramine and 11.7 g (g-mol) of salicylic acid are charged. The mixture is heated on an oil bath to the temperature of 150° C. Within the first five minutes of the reaction the reaction mixture is self-heated and ammonia evolution is observed. The mixture is maintained for 1.5 hours under stirring and then poured, still in a hot condition, into a cup. The resulting product is solidified to give a solid brittle darkamber resin with the drop point of 121° C.

EXAMPLE 15

A mixture of 78.7 g of octylphenol with the molecular weight of 220, 7 g of para-hydrobenzoic acid and 14.3 g of hexamethylene tetramine are heated at 130° C for 1 hour. A light yellow melt is poured into a porcelain cup; the resin drop point is 93° C.

EXAMPLE 16

To 16 l of commercial latex of butadiene alpha-methylstyrene rubber (analogue of rubber-1712) with the solids content of 20% there are added 7.5 g of the condensation product of octylphenol with hexamethylene tetramine prepared as in Example 1 and 336 g of naphthenoaromatic oil. Separation of rubber is effected by a conventional method using sodium chloride and sulphuric acid.

In a similar manner control samples of rubber with the commercially employed antioxidant system (Neozone D + diphenyl-p-phenylene diamine (DPPD), Wingstey 200 produced by Goodyear (p-phenylene diamine redivative) and phenol-formaldehyde resin are prepared.

Rubber stability is evaluated by retaining Mooney viscosity after rolling at 140° C for 20 minutes. Treated by rolling are 200 g of rubber; clearance between rolls is 1 mm, roll dimensions 320 × 160 mm, friction ratio 1:1.24. Data obtained for different proportions of the antioxidant are shown in Table 9 hereinbelow.

As it is seen from Table 9, phenolamine resin prepared from octylphenol and hexamethylene tetramine is considerably superior to phenol-formaldehyde resin and commercial antioxidants on its stabilizing effectiveness.

Table 9

| | Stability of 1712 Type Resin under Conditions of Thermomechanism Treatment on Rolls | | |
|---|---|---|---|
| No. | Antioxidant | Percentage | Retained Mooney viscosity after rolling, % |
| 1. | Condensation product of octyl phenol with hexamethylene tetramine | 0.5 1.0 | 77 76 |
| 2. | Neozone D + DPPD | 1.2 0.3 | 31 |
| 3. | Wingstey-200 | 0.5 | 33 |
| 4. | Phenol-formaldehyde (novo lac) resin | 1.0 | 47 |

EXAMPLE 17

To 200 g of butadiene-alpha-methylstyrene rubber filled with 15% of an aromatic oil containing 1.2% of Neozone D there are added, during the rolling operation, 1 g of a condensation product of nonyl-phenol with hexamethylene tetramine prepared as in Example 6. Samples of the initial rubber with the phenolamine resin are maintained at 140° C for 30 minutes in the air. Shown in Table 10 hereinbelow are data illustrating initial plasticity and that after ageing (by the Walles method) and index of retained plasticity expressed in percent.

As it is seen from Table 10, in the presence of the phenolamine resin of the present invention the test rubber retains its properties practically unchanged, while the rubber with Neozone D is deeply destructed.

Table 10

| | Retained Walles plasticity of a rubber with a condensation product of nonylphenol with hexamethylene tetramine | | | |
|---|---|---|---|---|
| | | Walles plasticity | | Retained plasticity index, % |
| No. | Antioxidant | initial | after ageing | |
| 1. | Neozone D | 0.23 | 0.05 | 27 |
| 2. | Condensation product of nonylphenol with hexamethylene tetramine | 0.22 | 0.20 | 95 |

EXAMPLE 18

To a butadiene-styrene rubber filled with 15% of a naphthenoaromatic oil is added, during the rolling operation, a phenolamine resin prepared by condensation of hexamethylene tetramine with cumylphenol as in Example 8 hereinabove. Control samples are filled with a phenol-formaldehyde novolac resin and Neozone D.

Shown in Table 11 hereinbelow are data illustrating alteration of physico-mechanical properties of a rubber during its mechanical processing on rolls at the temperature of 140° C for 20 minutes.

The data of Table 11 reveal that the incorporation of the phenolamine resin according to the present invention into a rubber makes it possible to substantially increase its stability to a level of retention Defo-hardness as high as 94% after ageing. Retained Defo-hardness of the rubber under the conditions shown in Table 11 in the presence of Neozone D and a phenol-formaldehyde resin is 29%.

Table 11

| | Rubber Stability under Conditions of Thermomechanical Treatment | | | |
|---|---|---|---|---|
| | | | Retained | |
| No. | Antioxidant | Percentage | Defo-hardness, % | Recovery, % |
| 1. | Neozone D | 1.5 | 29 | 29 |
| 2. | Phenol-formaldehyde resin | 0.3 | 29 | 26 |
| 3. | Condensation product of cumylphenol with hexamethylene tetramine | 0.1 | 78 | 88 |
| 4. | " | 0.3 | 94 | 100 |
| 5. | " | 0.5 | 91 | 100 |

EXAMPLE 19

To 100 g of a butadiene-styrene rubber filled with 15% of a naphtheno-aromatic oil 0.30 g of a resin prepared by condensation of hexamethylene tetramine with a mixture of octylphenol and salicyclic acid as in Example 11 is added on rolls.

Thermal ageing is effected at 140° C for 30 minutes; retained plasticity index is 90%; for a control sample containing Neozone D in the amount of 1.2% it is equal to 45%.

What is claimed is:

1. Phenolamine resins containing a fragment of a substituted phenol and methylene amine bridges of the formula:

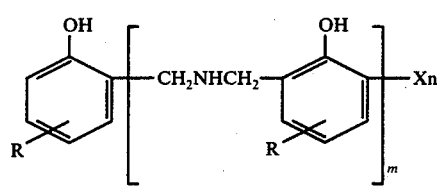

where X is H or

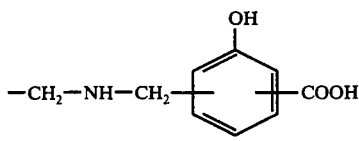

$m$ and $n$ are of from 1 to 20; when X is H, R represents an alkyl radical with 5 to 12 carbon atoms, phenylethyl, cumyl, hydroxyarylalkyl, carboxy; when X is

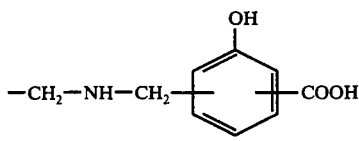

R represents an alkyl radical with 1 to 12 carbon atoms, phenylethyl, cumyl, hydroxyarylalkyl, or carboxy comprising a product of condensation of hexamethylene tetramine with a phenol component selected from the group consisting of an alkylphenol with 5 to 12 carbon atoms in the alkyl radical having a molecular weight of from 160 to 350, styrene-alkylated phenol, cumyl-phenol, diphenylolpropane, hydroxybenzoic acid and mixtures thereof.

2. Phenolamine resins as claimed in claim 1 of the formula

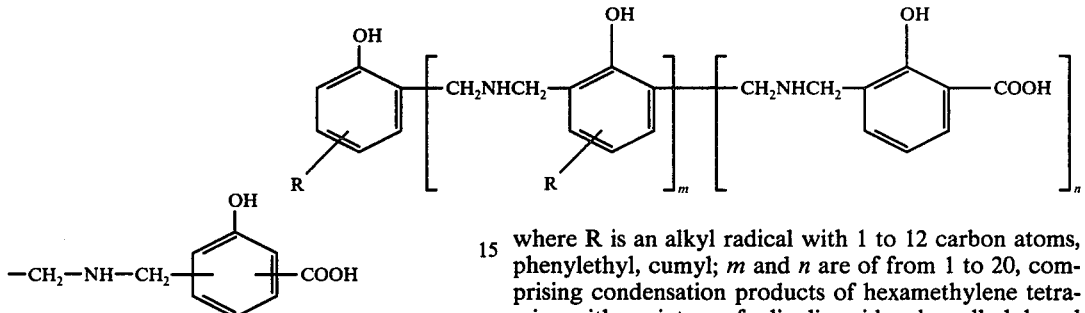

where R is an alkyl radical with 1 to 12 carbon atoms, phenylethyl, cumyl; $m$ and $n$ are of from 1 to 20, comprising condensation products of hexamethylene tetramine with a mixture of salicylic acid and an alkylphenol with 1 to 12 carbon atoms in the alkyl radical or styrene-alkylated phenol or cumylphenol.

3. A method of preparing phenolamine resins as claimed in claim 1 comprising condensing hexamethylene tetramine with a phenol component representing an alkylphenol with 5 to 12 carbon atoms in the alkyl radical and a molecular weight of from 160 to 350, styrene-alkylated phenol, cumylphenol, diphenylolpropane, hydroxybenzoic acids or mixtures thereof taken in a molar ratio of from 0.02:1 to 1:1 at a temperature within the range of from 90° to 180° C.

4. A method as claimed in claim 3, wherein said condensation is effected with hexamethylene tetramine and a phenol component representing a mixture of salicylic acid and an alkylphenol with 1 to 12 carbon atoms in the alkyl radical taken in a molar ratio of from 0.02:1 to 1:1 at a temperature within the range of from 90° to 180° C.

* * * * *